(Model.)

W. H. SPOERL.
FURNITURE CASTER.

No. 291,238. Patented Jan. 1, 1884.

WITNESSES:
John R. Brooks
A. Myers

INVENTOR
William H. Spoerl
by James W. See
ATTORNEY

UNITED STATES PATENT OFFICE.

WILLIAM H. SPOERL, OF HAMILTON, OHIO.

FURNITURE-CASTER.

SPECIFICATION forming part of Letters Patent No. 291,288, dated January 1, 1884.

Application filed September 15, 1883. (Model.)

*To all whom it may concern:*

Be it known that I, WILLIAM H. SPOERL, of Hamilton, Butler county, Ohio, have invented certain new and useful Improvements in Casters, of which the following is a specification.

This invention pertains to that class of furniture-casters which are provided with two or more floor-wheels carried in an oscillating housing. The nature of my improvements will be understood from the following description, in connection with the accompanying drawings, in which—

Figure 1:
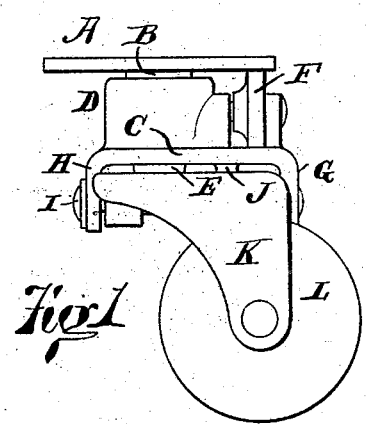
Figure 2:
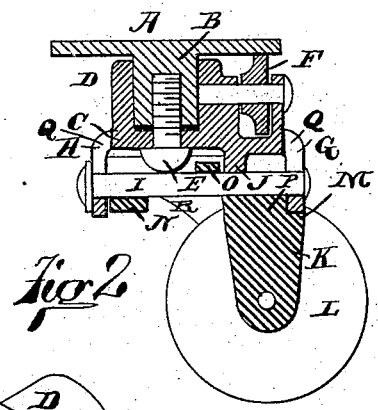
Figure 3:
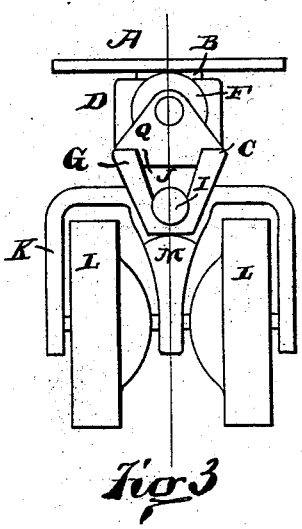
Figure 6:
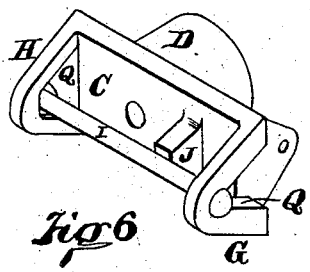
Figure 4:
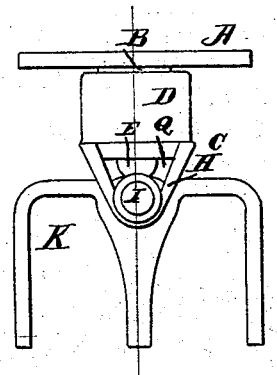
Figure 5:
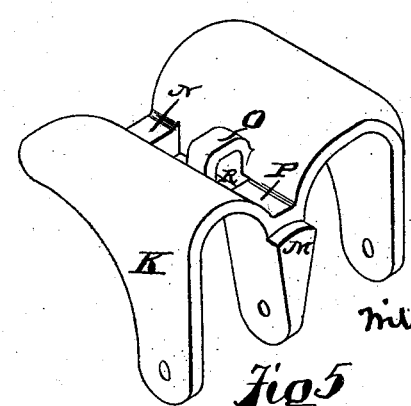

Figure 1 is a side view of the caster embodying my improvements; Fig. 2, a vertical section of the same; Fig. 3, a rear view of the same; Fig. 4, a front view of the same; Fig. 5, a perspective view of the housing, and Fig. 6 a perspective view of the yoke-piece laid upon its side.

In the drawings, A represents a piece to attach to furniture; B, a short spindle pending therefrom; C, a yoke-piece arranged to swivel upon this spindle; D, a boss upon the upper side of the yoke-piece, surrounding and fitting the same; E, a screw or rivet uniting the yoke to the stem; F, an anti-friction wheel supported in jaws in the yoke and arranged to bear upon the attaching-piece A; G, a lug projecting downward from the rear end of the yoke-piece; H, a similar lug at the forward end of the yoke-piece; I, a rivet through these lugs and reaching the whole length of the yoke-piece; J, a bearing-lug projecting from the under surface of the yoke-piece and contacting against the upper surface of the rivet I; K, the housing; L, the floor-wheels; M, a convex horizontal shoulder upon the rear of the central lug of the housing, arranged to be borne upon by the foot of the lug G of the yoke; N, a bearing-bar at the front of the housing, so located as to bear up against the rivet I; O, a bearing-bar on the housing about midway of its length, arranged to bear upon the upper side of the rivet I; P, a bearing at the front of the housing for the lower side of the rivet I; Q Q, recesses cast in the upper side of the yoke at the lugs G and H, and whereby the upper sides of the rivet bearing in the lugs are left open; and R, a central cavity cast in the housing between the bearings N and T and under the bearing O.

The yoke-piece swivels upon the attaching-piece A, but is susceptible of no other motion. The anti-friction wheel F serves to reduce the friction of the swiveling motion. If desired, there may be several anti-friction wheels arranged for this purpose, as is often done in furniture-casters, and the yoke and attaching piece may be so modified as to admit of anti-friction-balls, as is often done in swiveling casters. The rivet I is supported in the lugs G and H, not with a tight fit, but with a trifle looseness sidewise. The openings Q permit the bearing in the lugs to be cast without coring; but the lugs may of course be cast solid and be drilled for the rivet I. The head of the screw E bears upon the upper side of the pin, and it, in connection with the bearing-lug J, supports the upward strains upon the rivet I. The housing has three bearings, M, P, and N, below the rivet I to sustain the strain, and also the upper bearing, O, to unite the housing to the yoke. The housing oscillates freely upon the yoke, the rivet I being the axis of oscillation, and the trifle of side motion of the rivet I, previously referred to, permits the housing to adjust itself sidewise a trifle in addition to this swiveling adjustment. This permits the proper centering of housing with reference to the draft-line, which should always pass through the axis of the swiveling motion. The recess R permits the casting of the rivet-bearings in the housing.

I do not confine myself to the form of attaching-piece A, nor to the use or non-use of anti-friction rollers, nor to the exact means shown for uniting the yoke to the attaching-piece.

I claim as my invention—

1. In a furniture-caster, the combination of a piece to attach to furniture, a yoke-piece fitted to swivel thereon, and provided at its ends with downward-projecting lugs, a rivet or axle of oscillation carried in said lugs, and a housing fitted to oscillate upon said rivet, substantially as and for the purpose specified.

2. In a furniture-caster, the combination, with the attaching-piece, the oscillating housing, and the rivet or axle of oscillation, of the yoke-piece having bearing-lugs for the rivet recessed, as at Q, substantially as and for the purpose specified.

3. In a furniture-caster, the combination, with a piece to attach to furniture and an oscillating housing, of a yoke fitted to swivel upon the attaching-piece and having recessed lugs, as set forth, the rivet I, and the attaching screw or rivet E, bearing upon said rivet I, substantially as and for the purpose specified.

4. In a furniture-caster, the combination, with a piece to attach to furniture, a yoke-piece swiveled thereto, and a rivet or axle of oscillation held therein, of a housing provided with two bearings for said rivet open at the top and a bearing for said rivet open at the bottom, substantially as and for the purpose specified.

5. In a furniture-caster, the combination, substantially as set forth, of a piece to attach to furniture, a yoke-piece to swivel thereon, and a housing fitted to oscillate with reference to said yoke, and having journals of oscillations broader than their axle, so as to permit side movement, substantially as and for the purpose specified.

6. In a furniture-caster, the combination, with a piece to attach to furniture, the yoke swiveling thereon, and the rivet or axle of oscillation, of the oscillating housing hung to said rivet, and provided with a convex shoulder, M, arranged to be borne upon by the yoke, substantially as and for the purpose specified.

7. In a furniture-caster, the combination of the piece A, provided with cylindrical stem B, the yoke C, fitting said stem, and provided with the anti-friction wheel F, the rivet I, and the housing K, substantially as and for the purpose specified.

WILLIAM H. SPOERL.

Witnesses:
  JAMES W. SEE,
  ISRAEL WILLIAMS.